United States Patent [19]

Herman

[11] Patent Number: 4,541,604

[45] Date of Patent: Sep. 17, 1985

[54] MATRIX BALANCING FIXTURE

[76] Inventor: Martin A. Herman, 2085 W. 114th St., Cleveland, Ohio 44102

[21] Appl. No.: 555,161

[22] Filed: Nov. 25, 1983

[51] Int. Cl.$^4$ ............................................. G01B 1/00
[52] U.S. Cl. ...................................... 249/33; 33/501; 33/552; 249/53 R; 249/83
[58] Field of Search .......................... 249/33, 53 R, 83; 33/174 R, 174 PB

[56]  References Cited

U.S. PATENT DOCUMENTS

| 2,839,836 | 6/1958 | Fuller | 33/174 PB |
| 2,879,602 | 3/1959 | Powers | 33/174 PB |
| 2,964,850 | 12/1960 | Herman | 33/174 PB |
| 2,973,582 | 3/1961 | Price | 33/174 PB |
| 2,999,282 | 9/1961 | Herman | 249/83 |
| 3,524,260 | 8/1970 | Ollar | 33/174 PB |

Primary Examiner—Caleb Weston
Attorney, Agent, or Firm—Oldham, Oldham & Weber Co.

[57] ABSTRACT

A matrix balancing fixture that has a pair of fixedly positioned spaced cartridges positioning opposed top and bottom templates for movement towards each other for engaging a test article at spaced vertical portions thereof with the test article being in an open ended box positioned between the cartridges; the fixture having a pair of indicators having operating members slidably mounted therein positioned on upper portions of the cartridges in spaced relation in a horizontal plane and control members connecting the templates on a cartridge to the indicators on the cartridge for convenient reading thereon.

5 Claims, 7 Drawing Figures

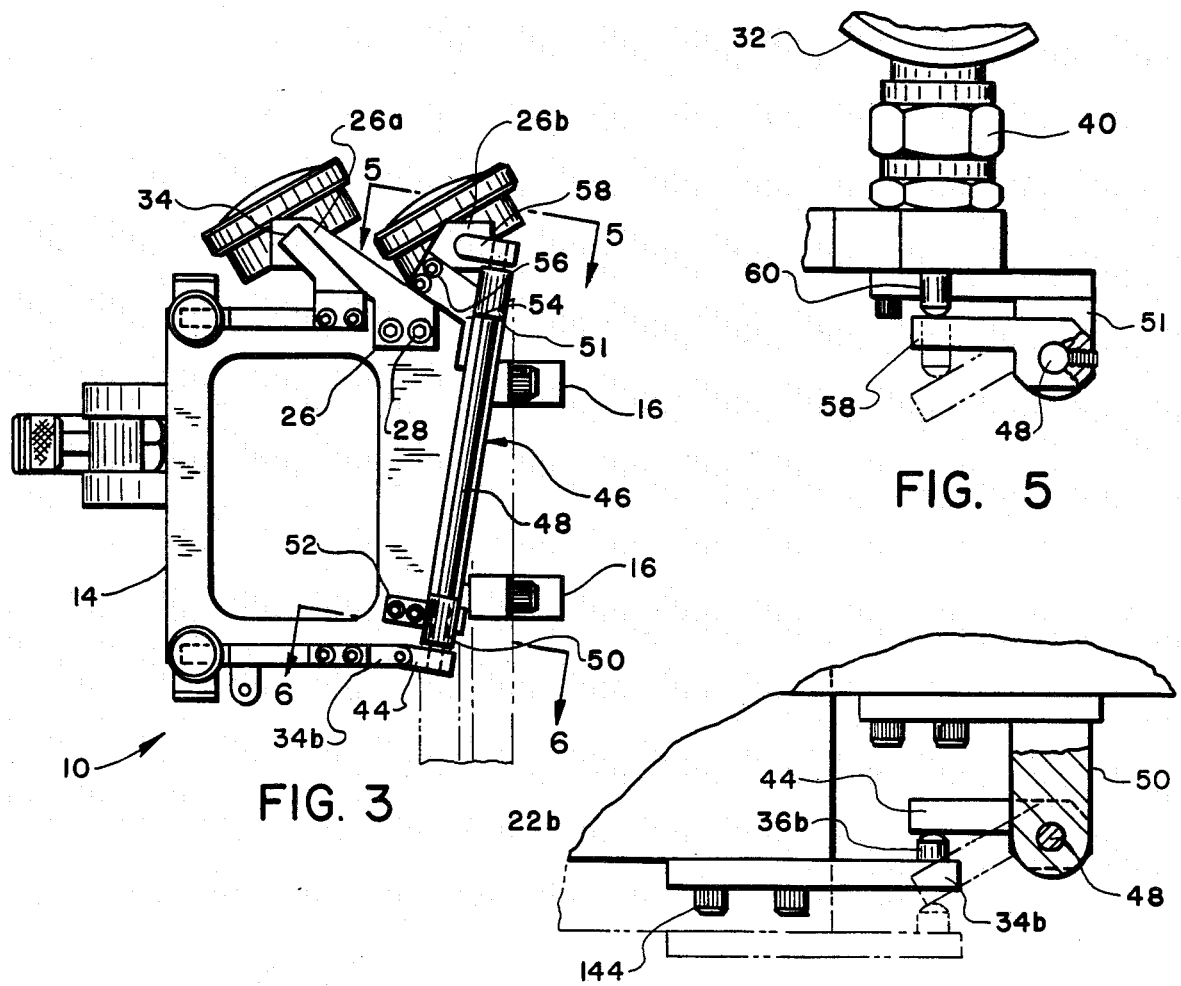
FIG. 3
FIG. 5
FIG. 6
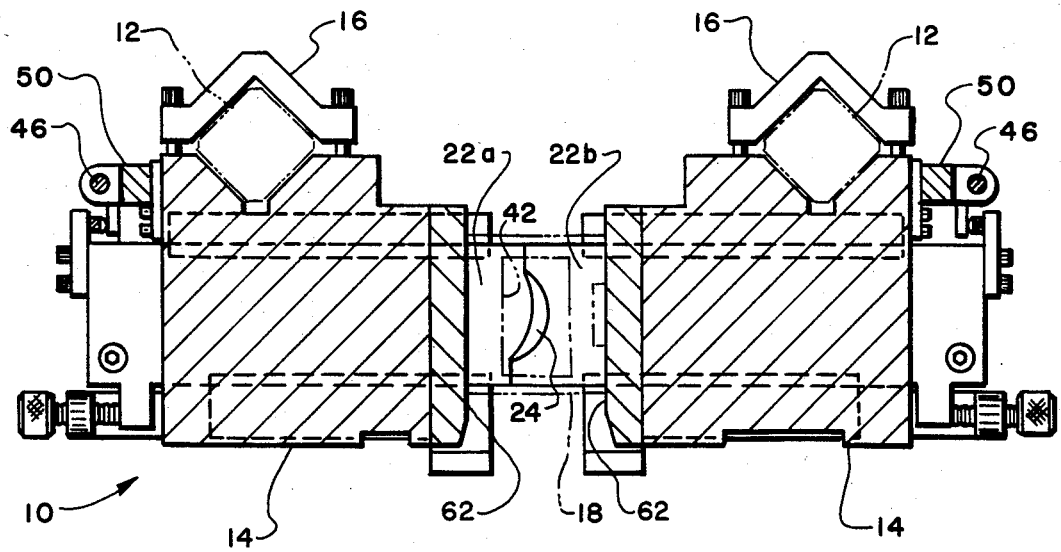
FIG. 4

MATRIX BALANCING FIXTURE

BACKGROUND ART

The present matrix balancing fixture, or apparatus for centering a test article in a carrier box relates to the universal type gauge covered in and disclosed in my prior U.S. Pat. No. 2,964,850 and to the universal type gauge frame shown therein. The present invention more specifically relates to and is an improvement upon the apparatus for centering articles in a matrix shown in my prior U.S. Pat. No. 2,999,282. In such prior matrix centering device or article, a carrier box for a test specimen was provided and slidable gauge templates are operably positioned by carrier cartridges mounted on support posts forming a part of the gauge frame or apparatus. These cartridges slidably and operatively position templates that can be moved laterally inwardly toward each other in horizontal planes for engaging a test article at spaced vertical portions thereof. The apparatus also positions an open ended box on a vertical axis so that the test article can extend therethrough and when the article is properly positioned in the receiving box, suitable embedment material or matrix carrier forming material is poured around the test article in the box to solidify in place to embed or position the test article in a given relationship to the carrier box and accurately formed margins thereof. In my prior apparatus, indicators or gauges are provided at several vertical spaced portions of the apparatus for reading and accurately indicating the position or size of the test specimen in the gauge. However, these indicators extended outwardly appreciably from the gauge apparatus and they were difficult to read as upper and lower indicators were provided at opposed lateral margins of the article centering apparatus.

OBJECTS OF THE INVENTION

The general object of the present invention is to provide a new and improved apparatus for centering articles in a matrix for further treatment in the production of the centered articles.

Another object of the invention is to provide all of the indicators in the centering apparatus at the upper portion of the carrier frame of the apparatus for easy, convenient reading of such indicator gauges.

Another object of the invention is to provide a more compact, accurate apparatus for centering articles in a matrix and to position all indicators in the apparatus directly on the frame posts or members fixedly secured thereto.

A further object of the invention is to adapt a universal style gauge frame for improved functioning for use in providing a fixture for centering articles in a matrix to facilitate further machining of the articles to complete the manufacture thereof.

The foregoing and other objects of the invention will be made more apparent as the specification proceeds.

BRIEF DESCRIPTION OF THE DRAWINGS

In the accompanying drawings:

FIG. 3 is a right side elevation of the fixture of FIG. 1;

FIG. 4 is a horizontal sectional view of the fixture of FIG. 1 taken on line 4—4 thereof;

FIG. 5 is a fragmentary elevation of a portion of the apparatus taken on line 5—5, of FIG. 3;

FIG. 6 is a further fragmentary view shown partially in section and taken on line 6—6 of FIG. 3.

When referring to corresponding members shown in the drawings and referred to in the specification, corresponding numerals are used to facilitate comparison between such elements.

BEST MODE FOR CARRYING OUT THE INVENTION

Figure 1:
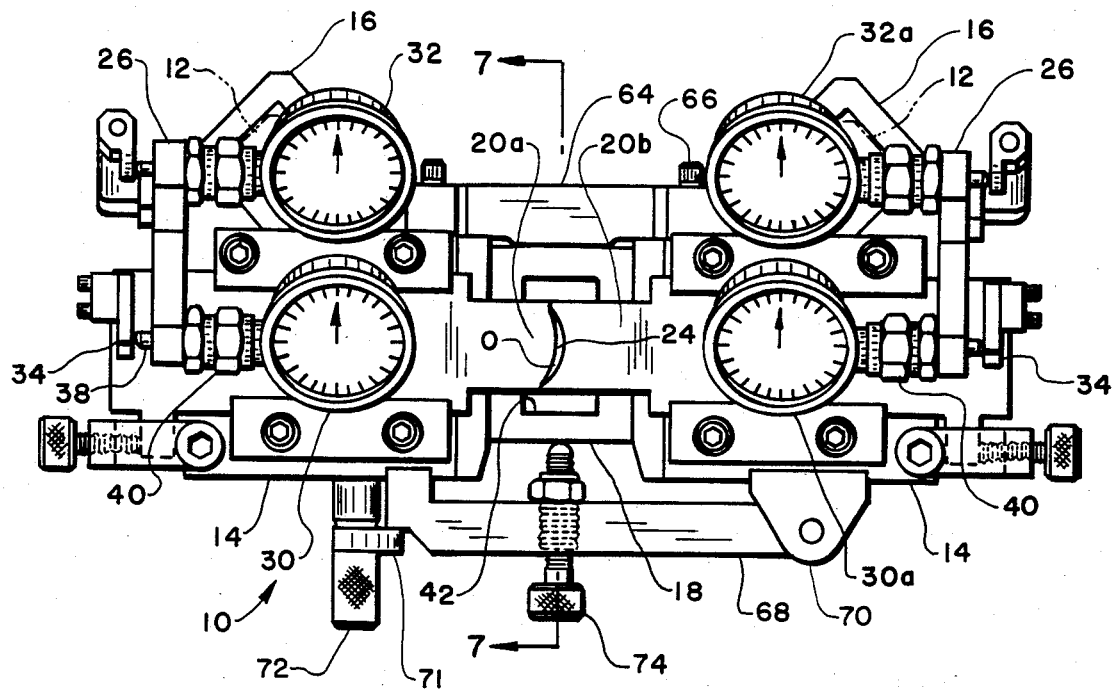
FIG. 1 is a plan view of a matrix balancing centering fixture embodying the principles of the invention.

Referring to the details of the drawings, a matrix balancing fixture 10 showing the principles of the invention is illustrated. Such fixture 10 is positioned on and extends between support posts 12 that are part of a universal type gauge as shown in my prior U.S. Pat. No. 2,964,850. The support base and other portions of such gauge are not part of the present invention and are not shown herein as the posts can be fixedly positioned in any desired manner.

A support cartridge 14 is suitably secured to each of the posts 12 as by a pair of vertically spaced clamps 16 bolted to the cartridge at a lateral margin thereof. These clamps 16 extend around an opposed side of the posts in relation to a side of the cartridge which has a lateral margin shaped to abut against the post and be secured thereto.

A pair of the cartridges 14 are present, one secured to each of the posts 12 and the cartridges are spaced apart to receive an open end article positioning box 18 therebetween as hereinafter explained. The box 18 is positioned on a vertical axis and has open top and bottom ends.

Each cartridge 14 slidably mounts a gauge plate or template on both its top and its bottom flat surfaces 14a and 14b with templates 20a and 20b being cooperative upper templates and templates 22a and 22b being the lower templates. The templates are designed to engage a test article 24 for centering or locating the same in the box 18 and/or the fixture 10. The templates are slidably positioned in planes at the ends of the box 18 and close the same in combination with the test article engaged by the templates.

A gauge or indicator bracket 26 is secured to the upper outer end of each of the cartridges 14 by cap screws 28. The brackets 26 have diverging arms 26a and 26b and these arms position gauge indicators 30 and 32 thereon for accurately showing the size of a test article in the balancing fixture. The templates 20a and 20b each have an upwardly extending finger 34 secured to their outer ends by cap screws and such finger 34 engage is positioned to a control or actuating pin 38 of the gauge 30 to transfer, accurately, the position of the template when engaging the test article by a contoured inner edge c of the template.

To transfer the positions of the template plates to the indicators or gauges 30 and 32, an indicator point may be secured to finger 34 to engage the control or actuating pin 38 of this gauge 30. The gauge 30 is secured in position by a conventional fitting 40 forming the operative mount for the individual gauge and which fitting 40 is threaded into a suitable tapped hole provided in an arm of the indicator bracket 26.

It is an important feature of the present invention that the two indicators or gauges 30 and 32 are positioned in a common horizontal plane, slightly offset from each other and which gauges may have their faces inclined in a desired direction to facilitate readying all of the four gauges normally provided on the matrix balancing fixture of the present invention. The indicators all are exposed at the top of the matrix balancing fixture and are relatively closely associated with each other as indicated in FIG. 1 to also provide a compact fixture.

In as much as the test article normally must be checked at a plurality of spaced points, the invention features apparatus for accurately transfering the position or size indication from the pair of lower templates 22a and 22b to a pair of the upper gauges and not require any gauge to be positioned adjacent the lower portion of the apparatus 10 of the invention to facilitate reading the position of the test article adjacent its lower end. Thus, FIG. 1 shows a second gauge 30a that will cooperate with the other gauge 30 and which is associated with the template 20b and is actuated in the same manner and by the apparatus as disclosed in relation to the upper template a so that the gauges 30 and 30a will cooperate to read the positioning and/or sizing of the opposite faces of the test specimens when the templates 20a and 20b are engaged therewith. The laterally inner edges of these templates 20a and 20b are contoured to engage to abut against each other at their edges as indicated in FIG. 1 when no test specimen is present. The gauges will indicate whether the cavity or opening formed by the templates and indicated at 0 is accurately centered in relation to the center opening 42 in the box 18.

FIG. 6 clearly shows an outer corner of the lower template 22b and that it has an actuating finger or control bracket 34b suitably secured thereto by cap screws 44 and which actuating finger 34b extends upwardly from the outer end of the template. It carries a contact finger or indicator point 36b thereon. The contact point 36b in turn is adapted to contact and control the position of an actuating finger 45 that forms a portion of the position transfer means 46 of the fixture of the invention.

Figure 2:
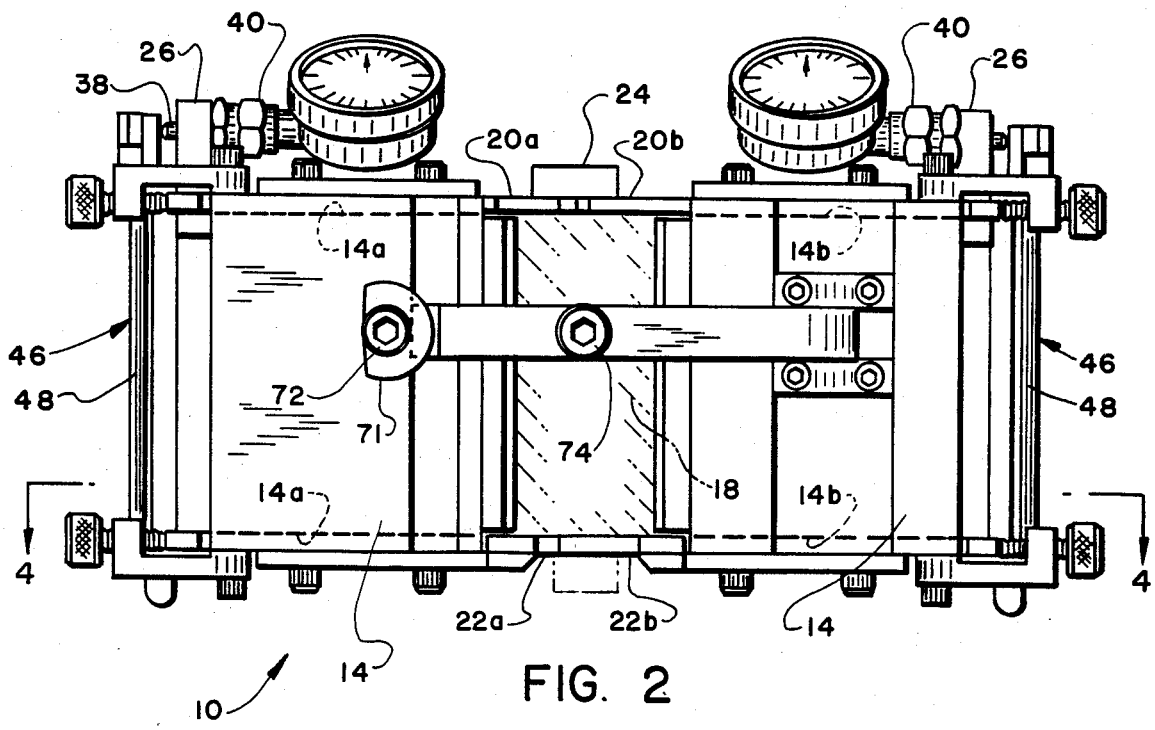
FIG. 2 is a front elevation of the fixture of FIG. 1.
Figure 7:
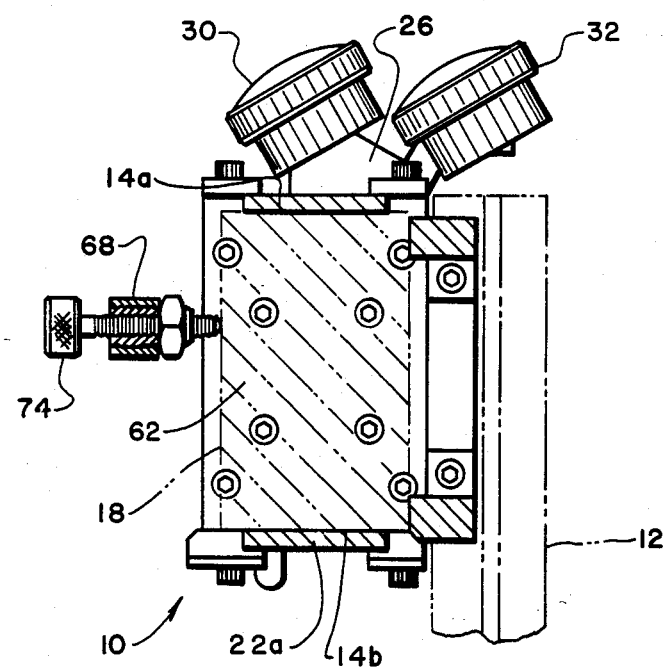
FIG. 7 is a fragmentary vertical section taken on line 7—7 of FIG. 1.

The position transfer means 46 is positioned on the laterally outer end of each of the cartridges 14. It is best shown in FIGS. 2 and 3 as comprising a transfer pin or shaft 48 that is journaled in brackets 50 and 51 that journal the transfer shaft therein. Such brackets or sleeve means 50 and 51 are positioned on each of the cartridges 14, as by upper and lower mounting arms or plates 52 and 54 that are bolted to laterally outer surfaces of the cartridges. FIG. 3 of the drawings best shows that the transfer shaft or pin 48 protrudes beyond the end portions of the sleeve means 50 and 51. FIG. 3 particularly shows that the upper support bracket 54 is secured to the indicator bracket 26 by cap screws 56. The upper end of this transfer shaft 48 has an operating finger 58 suitably secured thereto and extending substantially radially therefrom. The finger 58 and associated means are so positioned in the apparatus so that the operating finger 58 normally engages an operating pin or plunger 60 of the gauge 32 and controls the position thereof accurately to measure, in turn, the position of the lower template which in turn reflects the position of the test specimen in the matrix balancing or centering fixture of the invention.

In as much as the cartridges of the invention may be required to cool matrix or article engaging material placed in the box 18 to flow around the test article, some cooling action may be required in the fixture of the invention and hence the cartridges 14 is provided with an open center portion 61 into which any suitable cooling unit can be placed and controlled in a conventional manner.

Since the apparatus of the invention normally is used to test or position large numbers of articles, it is important that the fixture be designed to resist wear and not be knocked out of shape readily by engaging and disengaging test articles as moved into or from the fixture. Thus, the laterally inner surfaces of the cartridges 14 may have wear plates or surface plates 62 provided thereon and it is these plates that engage the box 18 when the box is introduced into or taken from the fixture of the invention.

A tie bar 64 is secured to the back surfaces of the cartridges 14 as by cap screws 66 to secure such tie bar accurately in the apparatus to close off a portion of the opening formed between the two cartridges. Next after the box 18 is positioned between adjacent inner surfaces of the cartridges 14 than a swing clamp arm 68 is brought into operative engagement with the box 18. Such clamp arm 68 is pivotally carried by a support bracket 70 that is suitably secured to one of the cartridges 14 and it has a free end that is in turn secured to and retained in position by clamp 71 or member 72 carried by the other of the cartridges 14. The clamp arm 68 in turn positions a lock screw 74 thereon in an adjustable manner so that such lock or clamp screw can be moved into engagement with the box to press it against the clamp arm 68 to retain such box in an accurate position. This keeps the box fixed in position for receiving a test article and aids in the operation of the matrix balancing fixture of the invention.

When it is desired to pour or place material into the box 18 for centering or retaining the test article in a given position, the molten material can be poured into the open upper end of the box around the article. The molten material will solidify around the test specimen and position it in an accurate relationship to the box 18 so that the test article is positioned on the center line, or starting point or axis desired for the test specimen. FIG. 1 shows the open upper end of the box 18 as the inner ends of the templates 20a and 20b are of reduced width to engage the test article but not to extend laterally very far therefrom. Any suitable pouring spout can be provided to facilitate flow of the matrix material into the box.

It will be realized that the matrix balancing fixture of the invention can be used with any desired test articles but that the apparatus is especially suitable for working with turbine blades which may have different contours at different axial portions thereof and wherein the blade has been cast from metal. The casting is to be positioned accurately in relation to the carrier box so that the required finish machining operations can be provided on exposed portions of the turbine blades.

Hence, the carrier box 18 used in the apparatus must receive and center a test article and the box has accurately formed external dimensions. The test specimen is accurately positioned in relation to the normally flat outer surfaces of the box whereby accurate machine operations can be performed on the test article based upon dimensions and measurements made from the outer periphery of the box.

From the foregoing, it is submitted that the apparatus of the invention is designed to provide accurate and ready readings of the gauges in the apparatus and the templates engaging the test article in the balancing fixture. Hence the test article can then be retained in a given position in the box 18 and other operations can be performed on the exposed portions of the test articles that are accurately located in relation to its carrier box 18. The gauges are all exposed to the upper end of the apparatus and are convenient to read even though upper and lower dimension checks are being simultaneously taken at at least two different portions of the test article. Thus it is believed that the objects of the invention have been achieved by the provision of a relatively compact, easily used and read matrix balancing fixture and associated means whereby the objects of the invention have been achieved.

While one complete embodiment of the invention has been disclosed, it will be appreciated that modification of this particular embodiment of the invention may be resorted to without departing from the scope of the invention.

What is claimed is:

1. A matrix balancing fixture adapted to be attached to and extend between a pair of spaced carrier posts, a cartridge attachable to each of said posts, a top and a bottom template slidably carried on top and bottom surfaces of each of said cartridges and movably in horizontal planes towards each other for engaging a test article;

an open ended box positioned between said cartridges to receive a test article on its open vertical axis with the article extending from the box at its top and bottom for engagement by said templates, the fixture comprising:

an indicator mounting bracket having a pair of diverging arms secured to each of said cartridges at an upper portion thereof;

an indicator having an operating pin slidably mounted therein and extending therefrom individually mounted on each of said arms to provide a first and second said indicator;

a control finger secured to a said top template and engaging the operating pin of said first indicator; and means including a rotatable member extending vertically of the fixture for connecting said bottom template to a control member of said second indicator whereby said indicators can accurately gauge the position and/or size of a test article engaged by said templates.

2. A matrix balancing fixture as in claim 1 where a vertically directed sleeve means is secured to each of said cartridges on an outer portion thereof, a transfer shaft is rotatably carried by said sleeve means and protrudes upwardly and downwardly therefrom, a transfer finger is fixed to the lower end of said transfer shaft and extends to a position at the outer end of one of said bottom templates to engage the same and be moved arcuately by horizontal movement of said template and an upper transfer finger is secured to the upper end of said transfer shaft and extends radially therefrom to engage said control member of said second indicator to gauge the position and/or size of the lower portion of said test article.

3. A matrix balancing fixture adapted to be attached to and extend between a pair of fixedly positioned cartridges, opposed top and bottom templates slidably carried on top and bottom portions of said cartridges and movably towards each other for engaging a test article at spaced vertical portions thereof, an open ended box positionable between said cartridges to receive a test article on its open vertical axis with the article extending from the box at its top and bottom for engagement by said templates, the fixture comprising:

an indicator mounting bracket having a pair of diverging arms secured to an upper portion of each of said cartridges;

an indicator having an operating pin slidably mounted therein and extending therefrom mounted on each of said arms to provide a first and a second indicator;

a control member on the upper template extending therefrom for engaging the axially movable operating pin of said first indicator; and means including a rotatable member having upper and lower contact fingers thereon extending vertically of the fixture and connecting said bottom template to a control member of said second indicator whereby said indicators will accurately gauge the position of a test article engaged by said templates.

4. A matrix balancing fixture as in claim 3, where a vertically directed sleeve means is secured to each of said cartridges, a transfer shaft is rotatably carried by said sleeve means and positions said contact fingers thereon and downwardly therefrom, a transfer finger is fixed to the lower end of said transfer shaft and extends to a position at the outer end of one of said bottom templates to engage the same and be moved arcuately by horizontal movement of said template, and an upper transfer shaft and extends radially therefrom to engage said control member of said second indicator to gauge the position and/or size of the lower portion of said test article.

5. A matrix balancing fixture adapted to be attached to an extend between a pair of spaced fixedly positioned cartridges, opposed upper and bottom templates slidably carried on top and bottom portions of said cartridges and movably towards each other for engaging a test article at spaced vertical portions thereof, p1 an open ended box positionable between said cartridges to receive a test article on its open vertical axis with the article extending from the box at its top and bottom for engagement by said templates, the fixture comprising:

a pair of indicators each having an operating member extending therefrom operatively mounted on each said cartridge to provide a first and a second said indicator, said indicators on said cartridges being positioned in a common horizonatal plane and all being visible from the top of said fixture;

the upper templates on each cartridge being engaged with the operating members of one indicator on a said cartridge; and means including a rotatable member extending generally vertically of the fixture and connecting said bottom template on each said cartridge to the operating member of the second said indicator whereby said indicators will accurately measure the positions of spaced vertical parts of a test article in relation to the centerline of the fixture.

* * * * *